United States Patent Office 3,788,952
Patented Jan. 29, 1974

3,788,952
APPARATUS FOR CONTROLLING THE FERMENTATION OF VOLATILE ORGANIC COMPOUNDS
Yutaka Iida, Tokyo, and Kazuo Hishinuma, Motohiko Hikuma, Tadashi Shirakawa, and Susumu Sakai, Kawasaki-shi, Kanagawa-ken, Japan, assignors to Ajinomoto Co., Inc., Tokyo, Japan
Continuation-in-part of abandoned application Ser. No. 82,473, Oct. 20, 1970. This application Jan. 13, 1971, Ser. No. 106,060
Claims priority, application Japan, Oct. 27, 1969, 44/85,841
Int. Cl. C12k 1/00
U.S. Cl. 195—127        3 Claims

ABSTRACT OF THE DISCLOSURE

A fermentation process in which an organic compound volatile with water vapor is consumed by a microorganism or an enzyme in an aqueous medium is controlled by continuously sampling the medium, vaporizing the sample stream, and feeding the vaporized material to a flame ionization detector. The conductivity of the flame indicates the concentration of the organic compound in the medium and provides a signal for controlling replenishment of the medium with the organic compound.

---

Figure 1:
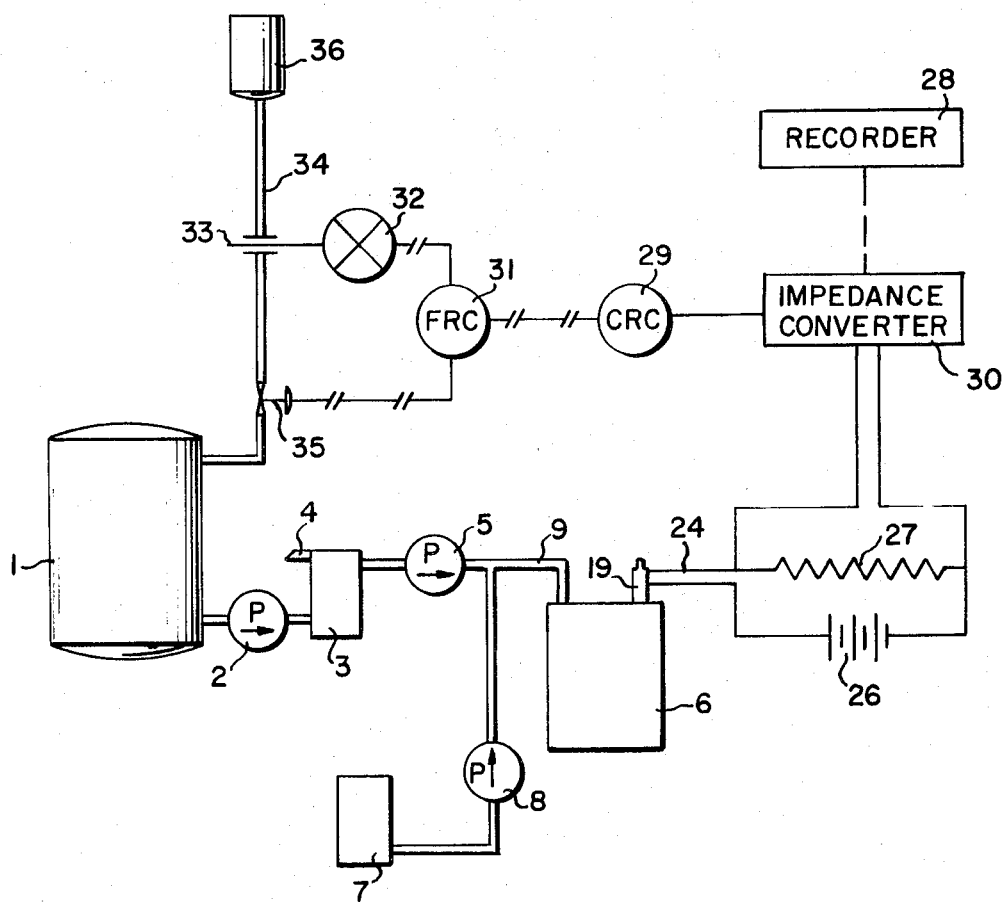

This application is a continuation-in-part of our copending application Ser. No. 82,473, filed Oct. 20, 1970, and now abandoned.

This invention relates to fermentation processes, and particularly to a method and apparatus for controlling the concentration of a volatile organic compound in a fermentation medium in which the compound is dispersed and being consumed during the fermentation.

In its more specific aspects, the invention is concerned with maintaining a desired concentration of a carbon source in a culture medium for microorganisms or a desired concentration of an organic substrate in enzymatic reactions.

Both types of fermentation reactions are known to be impaired by excessive concentrations of the carbon source or substrate, and to be slowed by concentrations which are below a fairly narrow optimum range. Carbon sources are consumed too fast by microorganisms, and organic substrates are consumed too fast in enzymatic reactions to permit replenishment to be made with reasonable accuracy on the basis of batch analyses.

For this reason, several procedures were proposed heretofore for continuously determining the concentration of a carbon source in a culture medium during fermentation. According to one known method, a sample stream of the culture medium is filtered continuously to remove cells, and the carbon source is determined colorimetrically in the filtrate. However, this method is too complex for industrial application because of the need for filtration, for diluting the filtrate and for developing color prior to colorimetric analysis.

According to another known method (Pat. No. 3,384,553), the oxygen consumption of the culture is monitored continuously as a measure of carbon source concentration. However, factors other than the concentration of the carbon source in the medium, such as pH and temperature, affect the oxygen consumption, and a drop in the oxygen consumption rate is not necessarily due to a deficiency in the carbon source.

It is a primary object of this invention to provide a method for determining the concentration of a volatile carbon source in a culture medium with adequate precision without need for filtering the culture medium, or for determining the amount of a volatile organic compound in a fermentation medium in which the compound is consumed by enzyme action, and for automatically controlling the concentration of the volatile compound in response to the concentration so determined.

Another important object is the provision of apparatus for performing the method outlined above.

With the above and other objects in view, the invention in one of its aspects mainly resides in a method of controlling a fermentation reaction in which a volatile organic compound is consumed while being dispersed in a liquid fermentation medium. According to the invention, the medium is continuously sampled. The samples sequentially obtained in this manner are heated to a temperature sufficient to volatilize the organic compound dispersed in each sample, and the volatilized compound is subjected to flame ionization analysis to produce a signal indicative of the concentration of the compound in the samples. Additional amounts of the compound are fed to the fermentation medium in response to the signal at a rate to maintain the concentration of the compound in the samples within a predetermined range.

In another aspect, the invention provides apparatus for performing the afore-described method. It includes a fermentation vessel adapted to hold the liquid fermentation medium. A sampling device communicates with the vessel for continuously withdrawing samples of the medium and is connected to a vaporizing system for vaporizing volatile material in the withdrawn samples. A flame ionization detector operatively connected to the vaporizing system receives the vaporized material and generates a signal indicative of the amounts of the volatile organic compound in the samples. A source of the volatile compound is connected with the fermentation vessel by a feeding arrangement which includes control apparatus operatively connected to the detector for controlling the feeding rate in response to the aforementioned signal and for thereby maintaining the concentration of the volatile material in the medium within a desired range.

Figure 2:
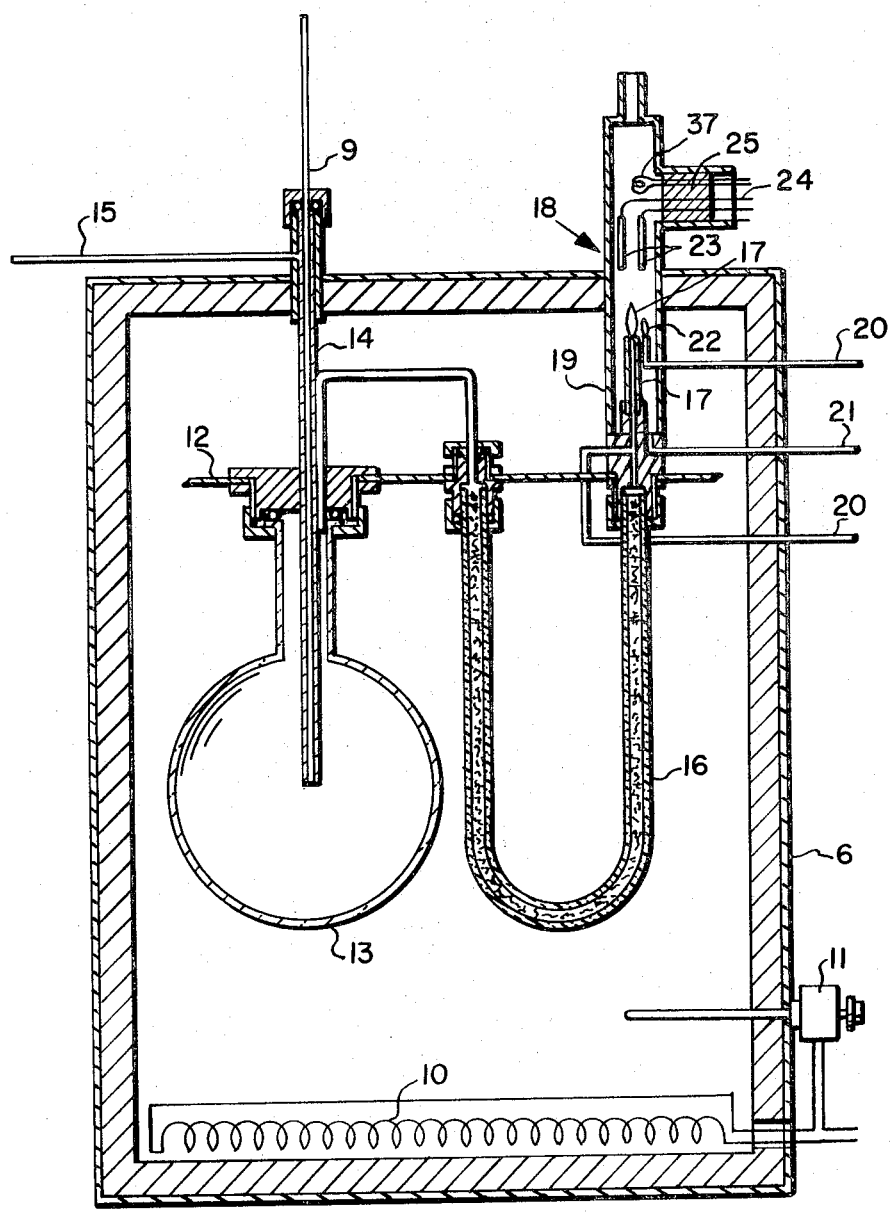

Other features, additional objects, and many of the attendant advantages of this invention will readily become apparent from the following detailed description of a preferred embodiment when considered in connection with the appended drawing in which:

FIG. 1 shows apparatus for performing the method of the invention partly in elevation and partly in conventional symbols; and FIG. 2 shows a portion of the apparatus of FIG. 1 in elevational section on a larger scale.

Referring initially to FIG. 1, there is seen a conventional fermentation tank 1 equipped with a jacket for maintaining its contents at a selected constant temperature, with aeration pipes for a culture medium contained in the tank, and with an agitator, as is conventional and not illustrated. A pump 2 withdraws a continuous stream of the medium from the tank 1 into an air separator 3 from which gases entrained in the medium can escape. Much of the pumped material is discharged from the separator 3 through an overflow chute 4. The amount of the discharged material is normally small enough so that it may be dumped without significant economic loss.

A metering pump 5 draws deaerated material at a constant rate from the separator 3 and feeds it through a pipe 9 to a vaporizer of which only a shell 6 is seen in FIG. 1. If needed, acid may be drawn from a container 7 by a metering pump 8 and mixed with the sample material in the pipe 9 before the mixture enters the vaporizer shell 6.

As is better seen in FIG. 2, the shell 6 encloses a chamber normally filled with air or filled to about three-quarters of its depth with a heat-transmitting liquid (not shown) whose temperature is maintained at a desired value by means of an electric heating element 10 arranged in series circuit with an adjustable thermoregulator switch 11 of the bimetal type. A bracket 12 in the shell 6 supports a receptacle which is a sealed round-bottom flask 13. The pipe 9 enters the flask through the sealed neck of the latter, and the portion of the pipe 9 exposed to the high temperature normally maintained in the vaporizer shell 6 is jacketed by a caxial tube 14 to which air is fed under pressure from a supply line 15. Terminal orifices of the pipe 9 and of the tube 14 are located concentrically near the center of the flask 13.

A U-tube 16 loosely packed with glass wool is suspended from the bracket 12. One of its legs is connected with the neck of the flask 13, and the other leg leads directly into the upright jet 17 of a flame ionization detector 18. The jet 17 is coaxially arranged in a wide tube 19 whose top end is open to the atmosphere. Hydrogen is fed to the jet 17 through a line 20, and air of combustion is supplied to the lower end of the tube 19 through a line 21. Hydrogen is also supplied through a line 20' to a pilot burner 22 adjacent the orifice of the jet 17. Two spaced electrodes 23 are suspended in the tube 19 above the hydrogen flame on the jet 17 by their lead wires 24 which enter the tube 19 through a plug 25 of insulating material in a side arm of the tube 19. The hydrogen flames on the jet 17 and the pilot burner 22 may be ignited by a coil 37 in the tube 19 which is heated electrically in the usual manner.

Reverting now to FIG. 1, it is seen that the lead wires 24, the electrodes 23 and the gap between the electrodes are arranged in a series circuit with a high-voltage battery 26 and a resistor 27. The voltage across the resistor 27 is proportionally related to the conductivity of the hydrogen flame between the electrodes 23 and transmitted to an indicating recorder 28 and to a conductivity recording controller 29 through an impedance converter 30, this arrangement being known in itself (see "Gas Chromatography" by A. B. Littlewood, Academic Press, New York, 1970).

The conductivity recording controller 29 is an element of a cascade control system which also includes a flow rate controller 31, a flow rate transmitter 32 coupled to an orifice flow meter 33 in a gravity feed line 34, and a diaphragm-operated control valve 35 in the line 34 which connects a storage tank 36 to the fermentation vessel 1.

In an actual embodiment of the aforedescribed apparatus, the flame ionization detector 18 and its associated electric circuitry were constituted by a commercially available unit (FID-1B type, Shimazu Seisakusho Ltd., Tokyo, Japan). The U-tube 16 had an internal diameter of 3 mm. and a length of 150 mm. The metering pump 5 fed the fermentation mixture to the vaporizer shell 6 at a rate of 1–5 ml. per hour. Air was supplied to the tube 14 at a rate of 80 ml. per minute. Hydrogen and air of combustion were supplied at respective rates of 100 and 1000 ml. per minute. The flask 13 had a capacity of 100 ml., and the chamber in the shell 6 was held at a temperature of 100°–250° C.

The samples withdrawn in a continuous stream from the vessel 1, which contained acetic acid as a carbon source for microbial fermentation, were acidified with 1 N HCl drawn from the container 7 at a rate of 1–5 ml./hr. to increase the volatility of the acetic acid. The liquid mixture introduced into the vaporizing flask 13 by the pipe 9 was immediately stripped of its volatile ingredients, water and acetic acid, and the residual solids were blown from the orifice of the pipe 9 by the air introduced as a carrier at a high volumetric rate through the tube 14.

The volatilized material was discharged from the flask 13 through the U-tube 16. Experiments had shown that the gas was discharged from the flask at a rapidly varying rate under the chosen operating conditions, and that the flow rate was stabilized by the glass wool in the tube so that it was practically uniform. The vapors were fed to the hydrogen flame on the jet 17, and the resistance of the gap between the electrodes 23 was a practically linear function of the acetic acid concentration in the culture medium so that this concentration could be read directly from the strip chart of the indicating recorder 28 with a negligible time lag.

The conductivity recording controller 29 cascaded into the flow rate controller 31 to provide a reference level inversely related to the measured acetic acid concentration so that the flow rate sensed by the orifice flow meter 33 was increased by the control valve 34 when the acetic acid concentration in the sample of the culture medium decreased, and vice versa.

The operation of this apparatus will further be illustrated by the following examples.

EXAMPLE 1

The fermentation vessel 1 had a capacity of 30 liters and was charged with 15 liters of an aqueous, sterile culture medium which contained, per 100 ml., 0.82 g. potassium acetate, 0.80 g. $Na_2SO_4$, 0.1 g. $KH_2PO_4$, 0.04 g. $MgSO_4.7H_2O$, 0.01 g. $FeSO_4.7H_2O$, 0.001 g. 

$MnSO_4.4H_2O$, 36 mg. soybean protein hydrolyzate (as nitrogen), and 20 micrograms thiamine.HCl.

750 ml. of an inoculum of *Brevibacterium lactofermentum* No. 2556 (ATCC 13869) were transferred to the medium and cultured at 31.5° C. under aerobic conditions. Gaseous ammonia was supplied at a rate to keep the culture medium at pH 7.8. Strong acetic acid (70 g./dl.) was fed to the vessel 1 from the storage tank 36 at a rate controlled to maintain the acetic acid concentration during fermentation at 0.5±0.1 g./dl. The total amount of acetic acid supplied was 16.9 g./dl., and the broth contained 8.95 g./dl. L-glutamic acid at the end of the fermentation period of 42 hours. The glutamic acid was recovered in a conventional manner.

EXAMPLE 2

In a procedure analogous to that of Example 1, the vessel 1 was charged with 15 liters of a medium containing, per deciliter, 2.0 g. glucose, 0.2 g. $KH_2PO_4$, 0.04 g. $MgSO_4.7H_2O$, 1 mg. $FeSO_4.7H_2O$, 1 mg. $MnSO_4.4H_2O$, 0.2 g. urea, 4 micrograms thiamine.HCl, 5 micrograms biotin, 160 mg. soybean protein hydrolyzate (as nitrogen), 60 mg. DL-methionine, and 0.7 g. acetic acid, and the medium was sterilized with steam. It was then inoculated with 750 ml. of a culture of *Brevibacterium flavum* ATCC 21128, and incubated at 31.5° C. while the pH was held at 7.5 by means of gaseous ammonia.

As the acetic acid was being consumed during the fermentation, it was being replenished from the tank 36 to maintain a concentration of approximately 0.5 g./dl. After 48 hours of fermentation, 6.1 g./dl. L-lysine were found in the broth. The total amount of acetic acid supplied was 23.1 g./dl.

EXAMPLE 3

A smaller fermentation vessel was substituted for the vessel described in the preceding examples and charged with 3 liters of an aqueous medium containing, per deciliter, 0.3 g. acetic acid, 0.2 g. ammonium acetate, 0.1 g. $KH_2PO_4$, 0.1 g. $MgSO_4.7H_2O$, 1 mg. $FeSO_4.7H_2O$, 1 mg. $MnSO_4.4H_2O$, 72 mg. soybeans protein hydrolyzate (as nitrogen), 0.3 micrograms biotin, and 20 micrograms thiamine hydrochloride.

The pH was held at 7.8 by means of gaseous ammonia automatically mixed with the air of aeration in a known manner, and ethanol was supplied to the culture medium as the principal carbon source at a rate controlled to maintain the ethanol concentration at 0.5±0.1 g./dl.

After 42 hours of cultivation, the broth contained 6.5 g./dl. L-glutamic acid and the total amount of supplied ethanol was 10.8 g./dl.

EXAMPLE 4

*Erwinia herbicola* (ATTC 21433) was inoculated in a culture medium containing, per deciliter, 0.2 g. tyrosine, 0.1 g. $KH_2PO_4$, 0.5 g. $MgSO_4.7H_2O$, 0.7 g. fumaric acid, 0.6 g. glycerin, 1.0 g. yeast extract, 0.5 g. beef extract, and 0.01 g. pyridoxine, and cultured aerobically at 31° C. for 24 hours.

An aqueous reaction mixture was made up from 2.0 g./dl. serine, 0.5 g./dl. catechol, and 1.0 g./dl. ammonium acetate, and adjusted to pH 8.0 in the fermentation vessel of Example 3. It was then inoculated with 1 ml. of the culture broth of *Erwinia herbicola* which contained β-tyrosinase and held at 37° C. for 20 hours while the catechol consumed by the enzyme reaction was replenished at a rate to hold the catechol concentration in the reaction mixture at 0.5 g./dl.

At the end of the fermentation period, 2.0 g./dl. L-dihydroxyphenylalanine had accumulated the fermentation mixture and were formed from 4.0 g./dl. catechol supplied by the automatic feeding system.

No acid was supplied from the container 7 in Examples 3 and 4 for obvious reasons.

It should be understood, of course, that the foregoing examples are merely illustrative of the fermentation processes in which the concentration of a volatile organic compound consumed during the fermentation may be controlled within a range readily held to ±20% of a constant nominal values. The method is applicable to carbon sources and other fermentation substrates which are volatile in the presence of water above the boiling point of the latter if their boiling points should be higher then 100° C. Among carbon sources and other fermentation substrates in current industrial application, the lower alkanols, lower alkanoic acids, aliphatic and aromatic hydrocarbons (petroleum fractions or benzene), and phenols are readily controlled by the method described. The apparatus is preferably calibrated empirically, and its controllers are set ot a desired concentration of the volatile organic compound in accordance with the calibration chart. The concentration for most economical operations is readily determined by experiment for each type of microorganism or enzyme source. Generally, consistently high yields of the desired for mentation products can be obtained in relatively short periods by the method and the apparatus described.

The apparatus employed is quite simple, its elements are staple articles of commerce, and it is readily services and maintained. In normal operation, the feeding assembly for the flask 13 consisting of the air tube 14 and the terminal section of the capillary pipe 9 and the flask itself may have to be replaced from time to time for cleaning. However, decomposition of the sample material in the pipe 9 by the heat of the heating element 10— in the shell 6 is held to a minimum by the cooling effects of the rapid air stream in the tube 14.

The apparatus may be modified in an obvious manner to provide a pulsed supply of individual samples to the vaporizing system, but the advantages to be gained from such operation do not justify at this time the more complex circuitry required for evaluating the analysis results and for translating them into control signals. It is therefore preferred to analyze samples which constitute a continuous stream when entering the vaporizer and to feed the volatilized material to the flame ionization detector 18 in a continuous stream mainly consisting of the air or other carrier gas supplied through the tube 14 and of water vapor.

The microorganisms referred to in the examples are identified by accession numbers of a depository agency and are freely available without our permission, and no agreement limiting use of the microorganisms exists between us and the agency. However, these microorganisms are merely typical of the wide range of fermentation reactions to which this invention is applicable since the concentration of a substrate consumed during fermentation is important at least to some extent to all fermentation reactions in current industrial practice, and of major importance to most.

In the fermentation processes illustrated by the instant examples, a practically constant concentration of a carbon source or other consumable substrate is desirable, and the apparatus shown in the drawing is designed for holding the concentration within narrow limits over the entire fermentation period. In some known fermentation processes, best results are obtained by maintaining different substrate concentrations in successive stages of the process, and suitable time-schedule controllers are commercially available for modifying the cascade control system described.

It will be obvious from the foregoing disclosure that the method and apparatus of the invention may readily be applied to fermentation processes employing volatile organic substrates in the manufacture of amino acids other than those referred to above, of nucleosides and nucleotides, the heterocyclic bases which are employed in synthesizing such nucleosides and nucleotides, antibiotics, vitamines, enzymes, and many more.

While the invention has been described with reference to specific embodiments, it will therefore be understood that it is not limited to the examples chosen for the purpose of the disclosure, but is to be construed broadly and restriced solely by the scope of the appended claims.

We claim:

1. A fermentation apparatus comprising, in combination:
    (a) a fermentation vessel adapted to hold a liquid, aqueous fermentation mixture including dispersed solids and a volatile, assimilable carbon source for said cells;
    (b) sampling means communicating with said vessel for continuously withdrawing samples of said mixture from said vessel;
    (c) vaporizing means connected to said sampling means for receiving said samples and for vaporizing volatile material including water and said carbon source from the received samples and for thereby separating the volatile material from residual solids, said vaporizing means including
        (1) a receptacle,
        (2) a first conduit connecting said receptacle to said sampling means and having an orifice in said receptacle for discharging said samples from said orifice,
        (3) a source of a gas under pressure,
        (4) a second conduit communicating with said source and having an orifice in said receptacle concentric with and surrounding said orifice of the first conduit, and
        (5) means for heating the contents of said receptacle;
    (d) flame ionization detector means communicating with said receptacle for receiving said vaporized material and for generating a signal indicative of the amount of said carbon source in said samples;
    (e) a container adapted to hold a supply of said carbon source; and
    (f) feeding means communicating with said container and said vessel for feeding said carbon source form said container to said vessel,
        (1) said feeding means including control means operatively connected to said detector means for controlling the rate of said feeding in response to said signal, and for thereby maintaining the concentration of said carbon source in said mixture within a predetermined range.

2. An apparatus as set forth in claim 1, further comprising flow-rate stabilizing means interposed between said vaporizing means and said detector means for making the rate at which said vaporized material is received by said detector means substantially uniform.

3. An apparatus as set forth in claim 1, wherein said receptacle is a round-bottom flask, and said orifices are substantially centered in said flask.

References Cited
UNITED STATES PATENTS

| | | | |
|---|---|---|---|
| 3,635,796 | 1/1972 | Imada et al. | 195—28 R |
| 3,586,605 | 6/1971 | Hosler | 195—28 R |
| 3,574,549 | 4/1971 | Eggertsen | 23—230 PC |

FOREIGN PATENTS

| | | | |
|---|---|---|---|
| 922,910 | 4/1963 | Great Britain | 23— 254 EF |

OTHER REFERENCES

Burchfield et al.: Biochem. Applications of Gas Chromatography, p. 144 (1962).

ALVIN E. TANENHOLTZ, Primary Examiner

M. D. HENSLEY, Assistant Examiner

U.S. Cl. X.R.

23—230 PC, 253 E; 195—28 R, 49, 115, 117, 139